Dec. 14, 1926. G. D. SUNDSTRAND Re. 16,505

MILLING MACHINE

7 Sheets-Sheet 1

Original Filed March 7, 1921

Inventor
G. D. Sundstrand
By Miller Christel & Barker
Attys

Dec. 14, 1926. G. D. SUNDSTRAND Re. 16,505

MILLING MACHINE

Original Filed March 7, 1921 7 Sheets-Sheet 2

Inventor
G. D. Sundstrand
By Miller Chindahl & Parker
Attys

Dec. 14, 1926. G. D. SUNDSTRAND Re. 16,505

MILLING MACHINE

Original Filed March 7, 1921 7 Sheets-Sheet 3

Inventor
G. D. Sundstrand
By Miller, Chindahl & Parker
Attys

Dec. 14, 1926. G. D. SUNDSTRAND Re. 16,505
MILLING MACHINE
Original Filed March 7, 1921
7 Sheets-Sheet 4
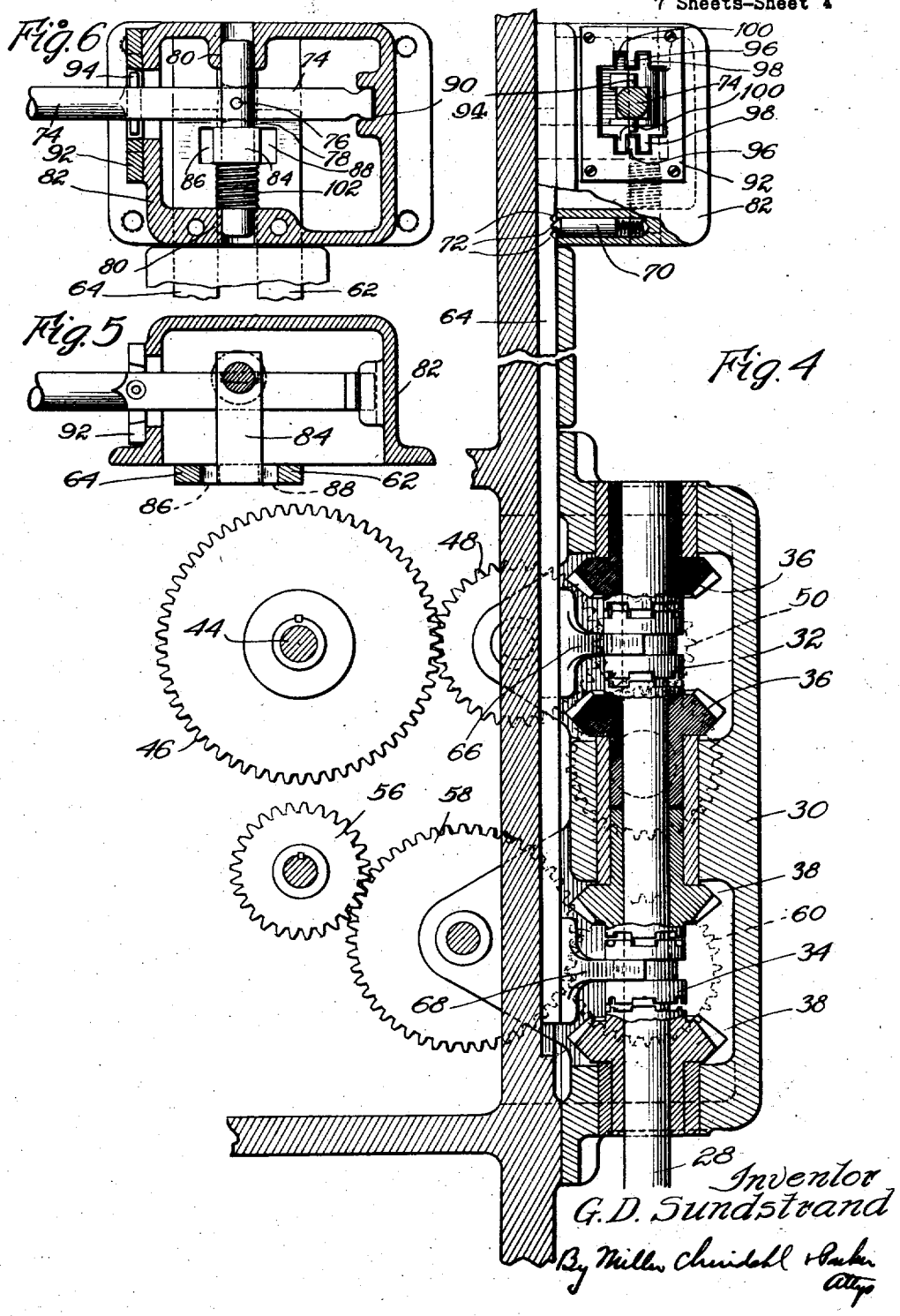

Dec. 14, 1926. G. D. SUNDSTRAND Re. 16,505
MILLING MACHINE
Original Filed March 7, 1921 7 Sheets-Sheet 5
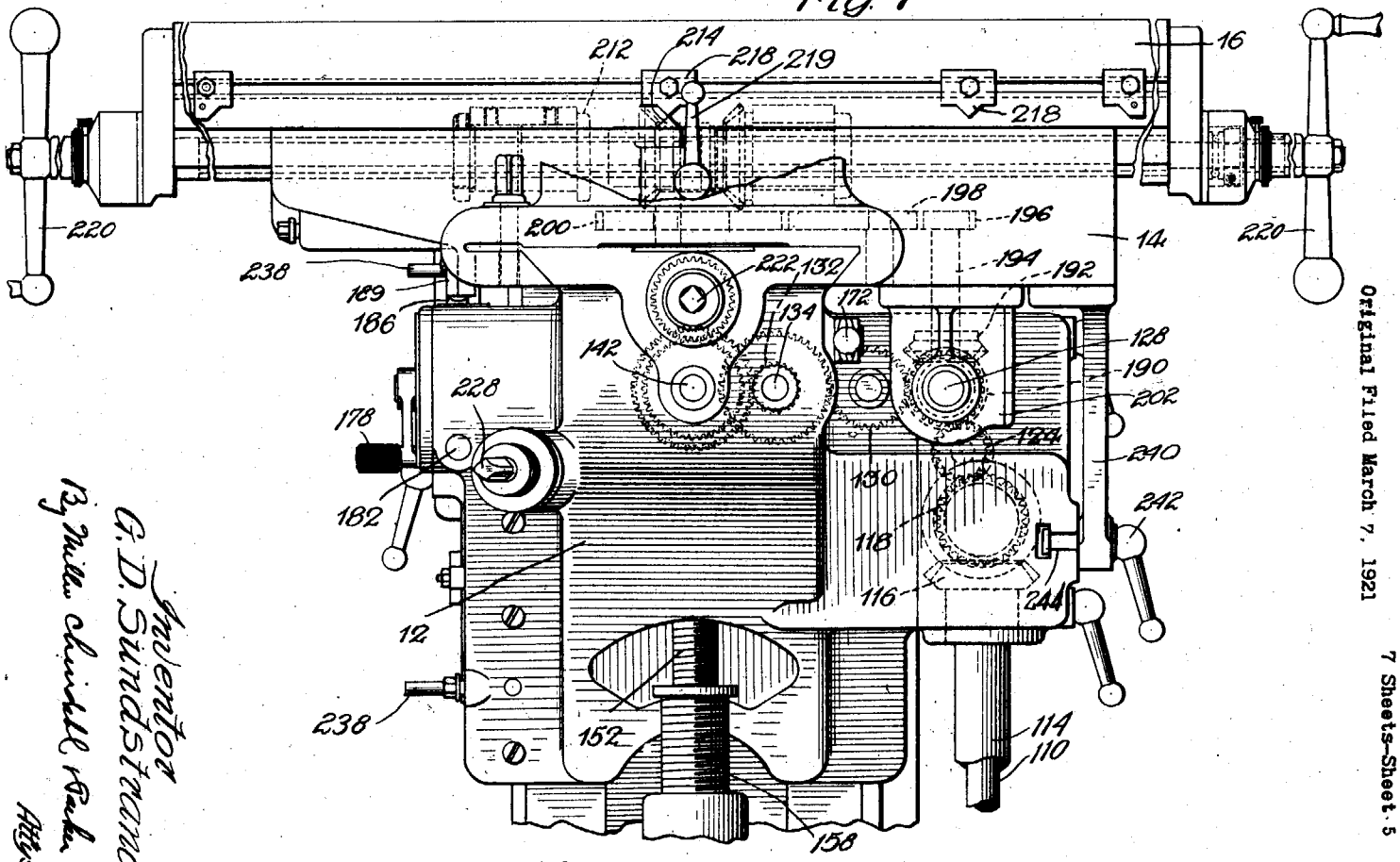
Inventor
G. D. Sundstrand
By Miller Christel & Parker
Attys Dec. 14, 1926. G. D. SUNDSTRAND Re. 16,505

MILLING MACHINE

Original Filed March 7, 1921 7 Sheets-Sheet 6

Inventor
G. D. Sundstrand
By Miller, Chindahl & Rule
Attys

Dec. 14, 1926. G. D. SUNDSTRAND Re. 16,505

MILLING MACHINE

Original Filed March 7, 1921 7 Sheets-Sheet 7

Inventor
G. D. Sundstrand
By Miller Chindahl & Barker
Attys

Reissued Dec. 14, 1926. Re. 16,505

UNITED STATES PATENT OFFICE.

GUSTAF DAVID SUNDSTRAND, OF ROCKFORD, ILLINOIS, ASSIGNOR, BY MESNE ASSIGNMENTS, TO SUNDSTRAND MACHINE TOOL CO., OF ROCKFORD, ILLINOIS, A CORPORATION OF ILLINOIS.

MILLING MACHINE.

Original No. 1,511,243, dated October 14, 1924, Serial No. 450,304, filed March 7, 1921. Application for reissue filed September 16, 1926. Serial No. 135,968.

My invention relates to milling machines and is directed chiefly to improvements in the devices for producing movements of translation between the rotating cutter and the work carrying element.

One object of the invention is to arrange a control for quickly securing either a fast motion, commonly known as a traverse, or a slow motion commonly known as a feed, in either direction. In the present embodiment I accomplish this object by the use of a selective hand lever not dissimilar from that employed for controlling the speed changes in automobile transmission.

Another object is to provide either a feed or a traverse in either direction by means of a single change speed device along any number of different lines of movement.

Another object is to locate the hand control lever above the work in an out of the way position to the extent that it is not apt to be accidentally struck by the workman's body as he moves about the machine and yet where it can be operated while the workman is in a convenient position closely to observe the work.

Further objects and advantages of my invention will become apparent as the description proceeds.

In the accompanying drawings:

Fig. 4 is an enlarged vertical section through the clutch and control lever casings.

Fig. 5 is a horizontal and Fig. 6 is a vertical sectional view of the control connections associated with the selective hand lever.

Fig. 7 is an enlarged front view, and Fig. 8 a plan view of the knee, saddle and table.

Figure 1:
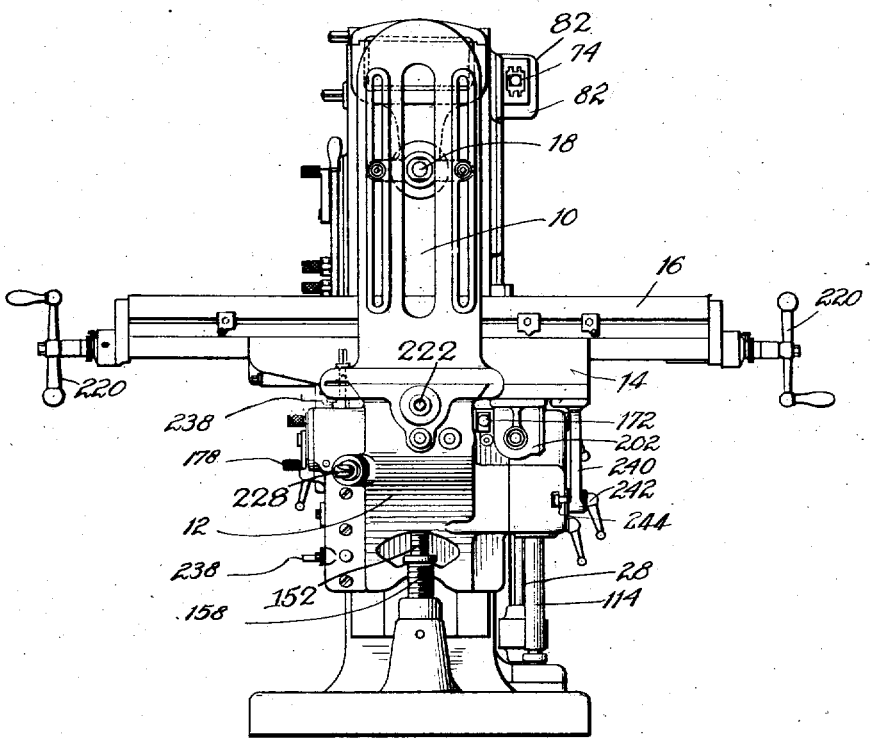
Figure 1 is a front view of a milling machine illustrating the application of my invention thereto.

In the embodiment of my invention selected for illustration I have shown the invention as applied to the well known knee type of milling machine comprising a column 10, a knee 12 vertically slidable on the column, a saddle 14 slidable on the knee toward and away from the column and a work table 16 slidable on the saddle across the face of the column. The work table is thus mounted for movement along any one of three mutually perpendicular lines of movement.

To perform a cutting operation by means of the machine shown, the spindle 18 must be rotated and the work table 16 moved with respect to the spindle to cause a cutting tool carried by the spindle to operate upon the work. The spindle 18 may be driven by means of power from a suitable source illustrated as an electric motor 20 carried on a bracket 22 extending from the rear of the column and connected to the spindle by transmission including reduction gearing within a housing 24, a reversing gear within the housing 26 and speed change gears mounted in the column for transmitting power to the spindle. As any one of a large number of well known devices may obviously be employed for speed reduction, for the reversing mechanism, and for the variable speed drive to the spindle, and as these devices in themselves form no part of my present invention, detailed description of the same is deemed superfluous.

*Selective control.*

To impart the desired movement to the work table the parts supporting it are clamped against sliding movement along all lines of movement except one and power must then be transmitted to produce a feed or traverse along this last mentioned line of movement. For this purpose a vertical shaft 28 mounted on the side of the column is connected to the work supporting parts by suitable transmission devices to be described hereinafter so as to deliver power to move the work table along any one of the lines of movement provided. For the purpose of providing either a feed or traverse in either direction along the line of movement selected, I have provided means for driving the shaft 28 in either direction at either one of two different speeds, a high speed which may be the same at all times, and a low speed or feed which may be varied over a large number of different values by means of the usual or any preferred type of speed change gearing.

Figure 3:
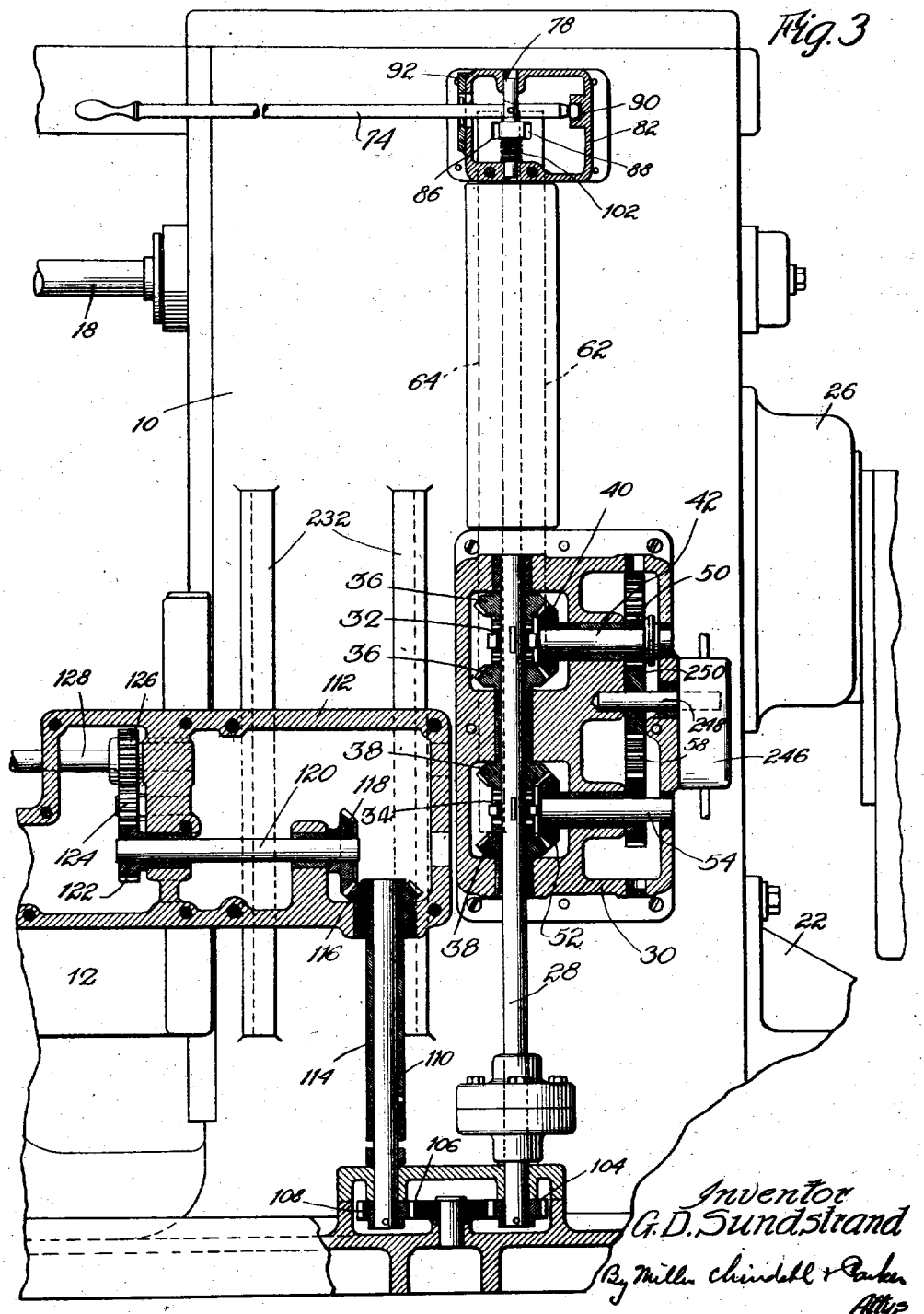
Fig. 3 is an enlarged detail of part of the transmission carried by the column.

Referring to Figs. 3 and 4, the shaft 28 extends upward through a casing 30 and carries two control elements in the form of splined clutch collars 32 and 34 interposed between pairs of opposed bevel gears 36 and 38, respectively. The upper pair of bevels 36 each mesh continuously with a bevel 40 mounted on a horizontal axis on a shaft 42 suitably journaled in the casing, which shaft is driven from a drive shaft 44 within the column through large gear 46, intermediate gear 48 and pinion 50 on the shaft. This provides for driving shaft 28 at high speed in either direction.

To drive the shaft at low speed in either direction, the lower pair of bevels 38 mesh with bevel 52 on horizontal shaft 54 which is driven from a pinion 56 through gear 58 and gear 60 on the shaft. The pinion 56 may be driven at any one of a number of different speeds by means of any suitable or preferred set of change gears, and as these devices are well known in the art and the particular set of gears selected for this purpose is immaterial so far as the present invention is concerned, detailed description of the change gears is deemed superfluous.

I have provided transmission means controlled by a single lever automatically operative to shift either one of the clutch collars into engagement with either of the bevels associated therewith but so constructed that it is impossible to provide more than one power connection to shaft 28 at any one time. These connections comprise vertical slides 62 and 64 carrying at their lower ends finger pieces 66 and 68 engaging grooves in the splined clutch collars. Each slide is resiliently held in one of three positions by means of a spring pressed plunger 70 (see Fig. 4) the point of which enters in one of three notches 72 in the slide. The control lever 74 is pivotally connected by a horizontal pintle 76 with a vertical plunger 78 slidable in bearings 80 (see Fig. 6) in a casing 82. The plunger 78 may reciprocate vertically and also rotate about its vertical axis to swing a horizontal arm 84 fixedly mounted on the plunger into notch 86 or notch 88 in the slides 64 and 62 respectively. Rotation of the plunger 78 by means of the hand lever 74 is made possible by entering the inner end of the hand lever in a horizontal slot 90 provided between spaced lugs extending from the rear wall of the casing 82. To limit the movements of the lever 74 the front wall of the casing 82 carries a cover plate 92 cut away as clearly shown in Fig. 4. A pin 94 carried by the lever 74 in the plane of the cover plate 92 engages the ends of centrally located projections 96 in the cover plate to prevent vertical movement of the lever when it is centrally positioned. In this position the arm 84 (see Fig. 5) projects slightly into both notches 86 and 88, but rotation of the plunger about a vertical axis far enough to permit the pin 94 to aline itself with vertical slots 98 or with vertical slots 100 in the cover plate will shift the arm into notch 86 or notch 88, respectively, to connect the control lever with slide 64 or slide 62 as the case may be. The weight of the control lever, plunger and arm is preferably approximately counterbalanced by a spring 102 so that whether the slide is to be moved up or down, the force applied by the workman need only be sufficient to overcome the holding action of the spring pressed plunger 70 to shift the slide and move the corresponding clutch collar into engagement with the bevel selected to produce the desired movement.

It will be seen that the horizontal shifting of the projecting end of the lever operates to select either the high speed or the low speed clutch at the will of the operator and that subsequent vertical displacement in either direction will operate to rotate shaft 28 at the speed selected by the first movement of the lever in the direction selected by the second movement. In use such an arrangement is even simpler than the system of control commonly employed in automobile transmissions, in that speed is selected by horizontal movement and direction by vertical movement, and that the selection of direction is the same regardless of the speed previously selected.

*Transmission to table.*

The connections for transmitting power from shaft 28 to move the table 16 along any desired line of movement will next be described. Shaft 28 drives the pinion 104 which through an intermediate gear 106 and pinion 108 drives the vertical upwardly extending shaft 110 (see Fig. 3). A combined knee clamp and transmission support 112 fixedly fastened on the knee projects beside the column 10 and carries a sleeve 114 having splined engagement with shaft 110. A bevel gear 116 on sleeve 114 and a bevel gear 118 transmit the power to a horizontal shaft 120 extending forwardly past the plane of the front of the column, and carrying at its front end a pinion 122. An intermediate pinion 124 driven from the pinion 122, meshes with a gear 126 having splined engagement with a drive shaft 128 for the table feed.

From the gear 126 another intermediate gear 130 (see Fig. 8) transmits power to gear 132 on the high speed shaft 134 carried by the knee. A splined clutch 136 on the high speed shaft 134 may be moved into engagement with a sleeve 138 rotatable on the shaft 134, the end of which sleeve is cut to form a pinion meshing with gear 140 on a slow speed transmission shaft 142 centrally located in the knee. Splined on the slow speed transmission shaft 142 is a sleeve 144 carrying gears at both ends. By sliding the sleeve to the left from the position shown in Fig. 9, gear 146 may be moved into mesh with pinion 148 on sleeve 150 to drive the vertical screw 152 through bevel gears 154 and 156 for raising and lowering the knee. The screw 152 enters the usual nut 158 carried by the base of the column 10 for this purpose. By sliding the sleeve in the other direction gear 160 may be moved into mesh with gear 162 on the saddle feed screw 164 which engages a nut 166 carried by the saddle to move the saddle toward and away from the column.

Figure 10:
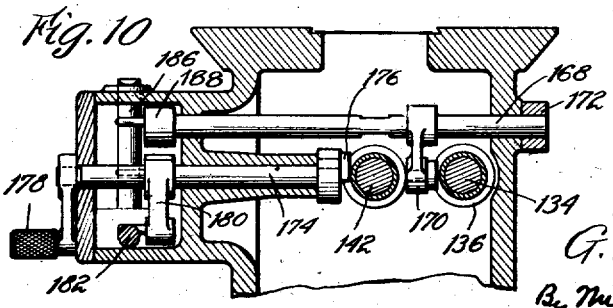
Figs. 10 and 11 are detail sectional views showing control mechanisms inside the knee.

For controlling the clutch 136 I employ a shaft 168 (Fig. 10) extending transversely through the knee, carrying an arm 170 engaging the clutch for shifting the same and operated by means of a suitable handle 172. For controlling the distribution sleeve 144 I employ another shaft 174 (Fig. 10) carrying a short crank 176 at its inner end and operated by means of a crank 178 at its outer end.

The usual safety means may be employed to prevent the workman from moving the knee or the saddle beyond their proper limits of travel in either direction. I have illustrated a bell crank lever 180 rotatably mounted on shaft 174 one arm of which engages a plunger 182 actuated by stops 184 on the column (see Fig. 8) when the knee has reached its limit of movement in either direction. The other arm of the bell crank element is connected to a vertical plunger 186, which vertical plunger also engages a crank 188 keyed on shaft 168 and will be operated by contact with suitable stops 189 (see Fig. 7) on the saddle when the saddle has reached its limit of movement in either direction. It will be seen that operation of either plunger 182 or plunger 186 will rotate shaft 168 and throw out clutch 136.

I have illustrated a suitable transmission to the table 16 from shaft 128, comprising a bevel gear 190 (see Fig. 7) on the end of shaft 128 meshing with a bevel 192 on a vertical shaft 194 which carries a pinion 196 driving an intermediate gear 198 and a drive gear 200 centrally located under the table. A casing 202 depending from the saddle supports bevel gears 190 and 192 and the splined connection between shaft 128 and gear 126 permits adjustment of the saddle without interference with the transmission of power to the table. A bevel gear 203 (see Fig. 9) is integral with or permanently fastened to the gear 200 and meshes with a bevel 204 carried by a sleeve 206 concentric with the table feed screw 208. A clutch collar 210 splined on the table feed screw may be moved into engagement with sleeve 206 to drive the feed screw, which screw engages a fixed nut 212 (see Fig. 7) and feeds the table. A suitable throw-out device is provided comprising a plunger 214 having a rack cut on one side engaging a pinion 215 formed on the shaft 216 which controls the clutch collar 210. Stops 218 are carried by the front edge of the table and will depress the plunger upon movement past the same in either direction to rotate shaft 216 and throw out the clutch. 219 is a hand lever on the shaft 216 for manually starting and stopping the table.

*Hand feed.*

Manual means has been provided for moving the table along any one of its three lines of movement comprising handles 220 carried by the table feed screw 208, a squared end 222 projecting from the saddle feed screw 164, and a shaft 224 carrying a bevel 226 meshing with the bevel gear 156 for manual operation of the screw 152, said shaft having a square end 228 adapted to be engaged by a suitable crank.

*Accessories.*

Figure 8:
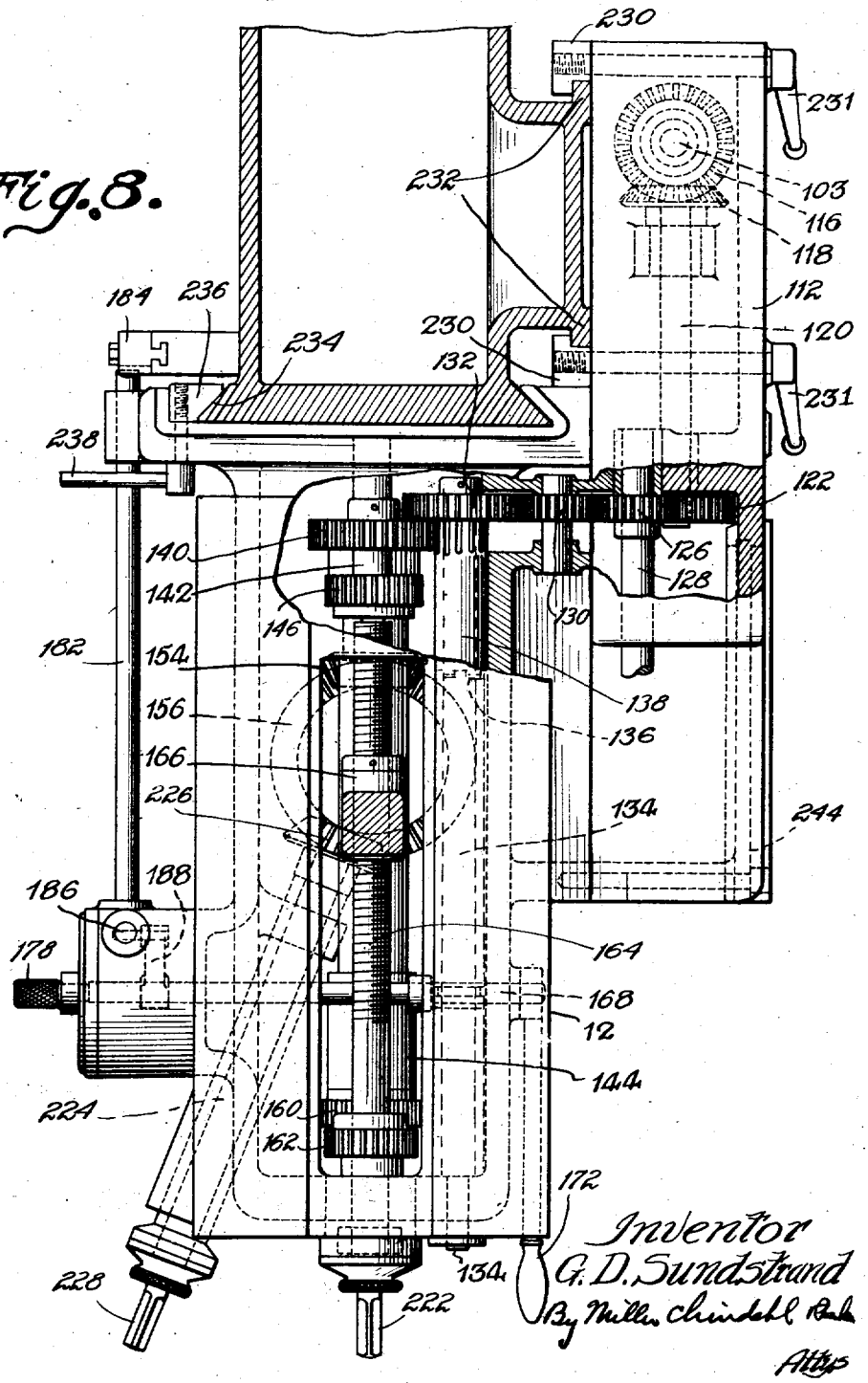
Figures 9, 11:
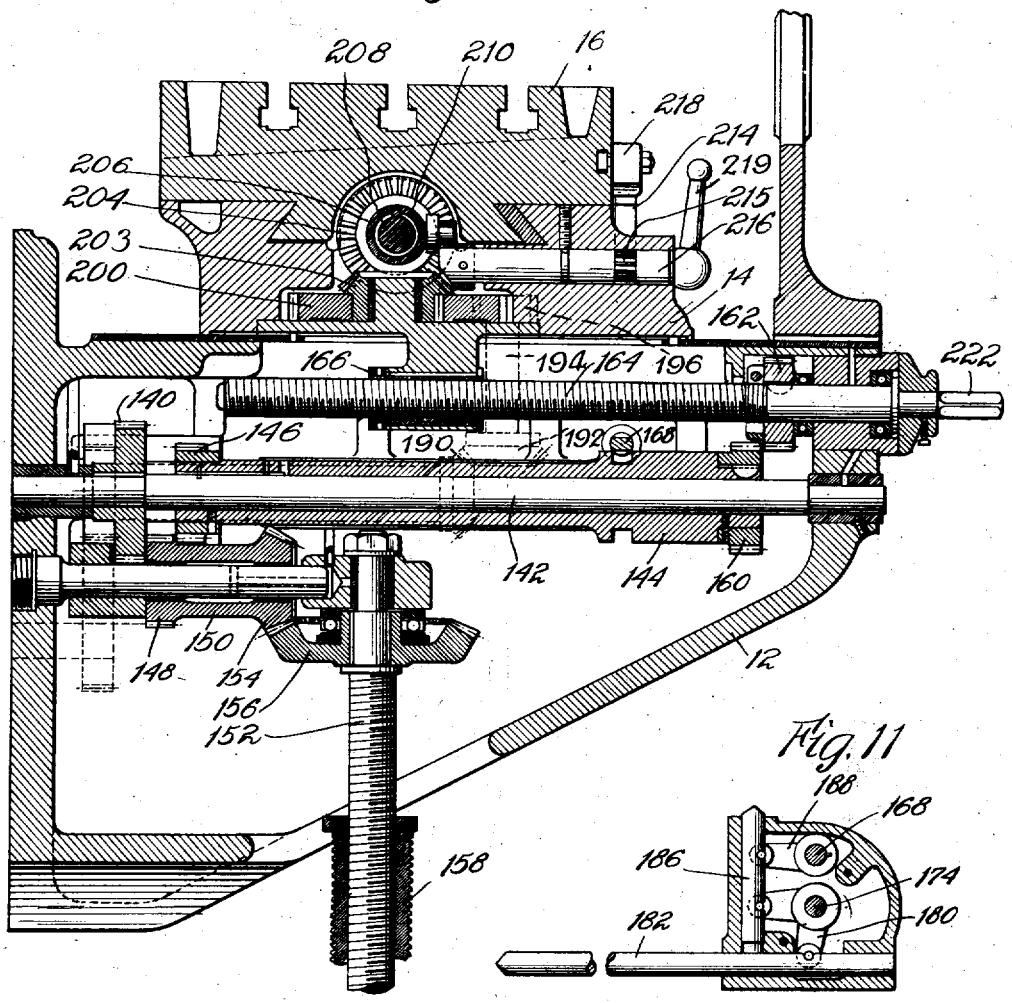
Fig. 9 is a central section through the same parts.

Means is provided for rigidly clamping the knee to the column. For this purpose a casing 112 is rigidly and permanently associated with the knee and projects beside the column as shown in Fig. 8. This projecting portion not only houses part of the transmission to the table, but also carries clamping members 230 operable by means of handles 231 to clamp the casing to ways 232 on the column. This additional clamping attachment securing support at points spaced by a considerable distance from the plane of the front of the column materially contributes to the rigidity with which the table may be supported. The ways carried by the column project outwardly as shown in Fig. 8, the configuration of parts being such that none of the re-entrant angles on the outside of the column are closed either by the column itself or by the clamping means so as to form a pocket in which dirt might collect. The knee is also clamped to its own ways 234 as usual, as by means of blocks 236 drawn into gripping engagement with the ways by handles 238.

Figure 2:
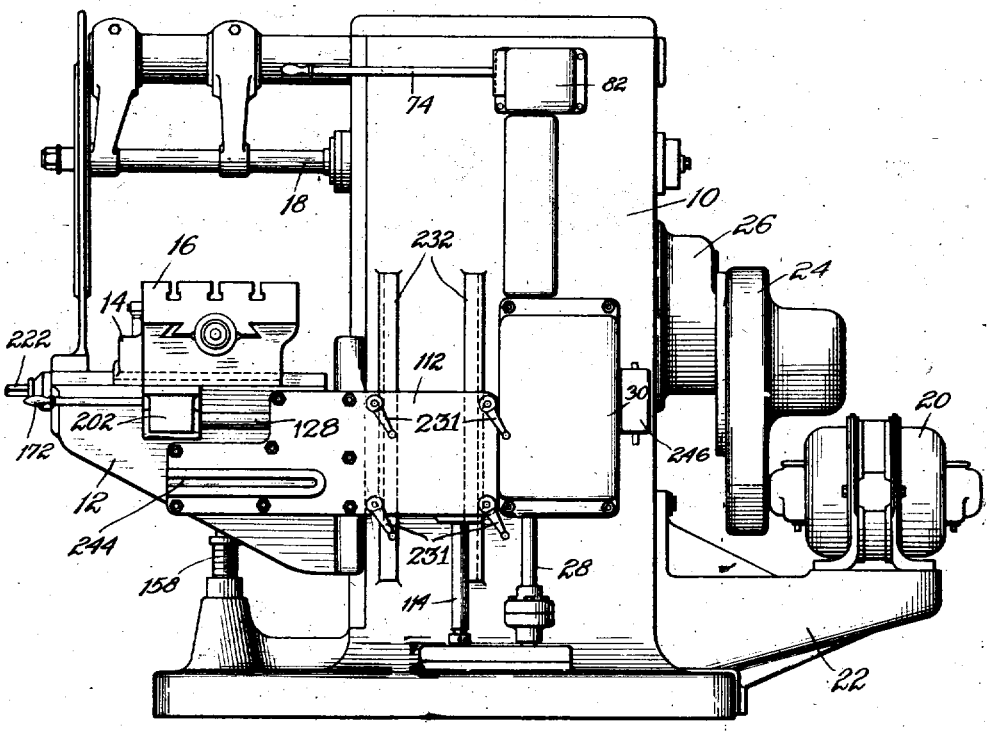
Fig. 2 is a side view of the same machine with the saddle clamp removed.

The rigidity of the table support is further increased by the use of means for clamping the saddle to the knee. Said means comprises a bracket 240 (see Fig. 1) permanently attached to the end of the saddle and carrying at its lower end clamping means 242 for clamping the saddle bracket to the casing 112 by engagement in a T-slot 244 (see Fig. 2).

A casing 246 (see Fig. 3) is conveniently mounted in an out of the way position at the rear side of casing 30 and houses a pump driven by shaft 248 and gear 250 meshing with pinion 50. By this means coolant for the cutter may be supplied through any suitable set of conducting pipes.

*Operation.*

In performing work on my improved machine, after the work has been clamped in place on the table 16, the motor 20 may be started. The knee may then be raised or lowered to bring the table to the desired height by operating the lever 74, the selecting crank 178 to shift the distribution sleeve 144, and the power-controlling lever 172 to shift the clutch 136. The knee may be moved in either direction by power at a fairly high speed until it is nearly in the proper position and subsequently at a much lower speed until the final position is still more nearly approximated. These adjustments are effected by means of lever 74. For final adjustment with great precision, lever 74 may be shifted to neutral and the manual adjusting means employed by applying a crank to the shaft-end 228. The knee is then clamped rigidly to the column both by its own clamping means and by clamping casing 112 to the side of the column.

The saddle may next be similarly adjusted by operating the crank 178 to shift the sleeve 144 to drive the saddle feed screw 164 and in making this adjustment also two speeds of power movement in either direction are available, after which precise adjustment may be accomplished manually by applying a crank to the shaft-end 222.

After these two adjustments are made, the work is ordinarily ready to be moved past the cutter. Upon connecting the transmission through shaft 110 to table 16 by operating the lever 219 two speeds of power feed controlled by lever 74 for moving the table in either direction are immediately available. The workman may stand with his right hand on lever 74 in a position facing toward the work so as to conveniently observe the operation, or if the rear vertical surface of the work is being machined, he may lean across the table with his left hand on lever 74.

In case the work to be placed on table 16 is unusually heavy the knee or saddle or both may be adjusted to their final positions and clamped in place before the work is placed on the table by means of the crane or derrick usually employed to handle heavy pieces of work. This will avoid clamping the knee in the distorted position produced by imposing the weight of the work on the guideways for the knee without further support, thus securing better alinement of the parts and greater accuracy in the finished work.

While I have illustrated and described in detail the preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. A machine tool having, in combination, a column, a movable element carried by said column and mounted for movement along any one of three mutually perpendicular lines of movement, means for preventing said element from moving in two of said lines while leaving it free to move in the remaining line, a control lever near the top of the column in a position to be readily grasped by the raised right hand of the workman, or by his raised left hand in case he leans over the work, power transmission for moving said elements, connections between said control lever and power transmission operative to effect movement of said element in either of two directions at either of two speeds along the line of motion selected, means to counterbalance the weight of the lever and associated parts to hold it in neutral equilibrium when not operated by the workman, and means for retaining it in any position to which it is moved by the workman.

2. A milling machine having, in combination, a column, a work table positioned in front of said column, power transmission for moving said table, a control lever near the top of the column projecting forwardly to a position over the work, and connections between said control lever and said power transmission whereby movement of said lever in one plane operates to select the speed of movement of the table without accomplishing the actual driving connection to produce such movement and subsequent movement of the lever in another plane operates to select the direction of movement of the table, such subsequent movement accomplishing the driving connections.

3. A machine tool having, in combination, a column, a movable element carried by said column and mounted for movement along any one of three mutually perpendicular lines of movement, a control lever near the top of the column in a position to be readily grasped by the workman, power transmission for moving said table including two constantly driven shafts and a third shaft carried by the column, and means operable by said control lever to connect either of said two shafts with the third shaft whereby to effect movement of said table in either of two directions at either of two speeds along the line of motion selected.

4. A milling machine having, in combination, a column, a work table positioned in front of said column, power transmission for moving said table, a control lever near the top of the column projecting forwardly to a position over the work, connections between said control lever and said power transmission whereby movement of said lever in one plane operates to select the speed of movement of the table and subsequent movement of the lever in another plane operates to select the direction of movement of the table, and means constraining the lever to move from its neutral position in the first mentioned plane only, and permitting movement in the second mentioned plane after a predetermined amount of movement in the first mentioned plane.

5. In a milling machine, a work table, a column, means on the column for supporting said table for movement in any one of three mutually perpendicular lines of movement, power transmission for moving said table including a shaft mounted on the column, drive means, and means including a single control element also mounted on the column and operable to effect a connection between said drive means and said shaft whereby to cause the table to move along the line selected in either direction at either one of two different speeds, a fast speed which is always the same for any given line of movement and a slow speed adjustable by the operator to any one of a number of values for each line of movement.

6. In a machine tool, in combination, a movable element, power transmission for effecting movement of said element, a single control lever, and connections between said control lever and said power transmission whereby movement of the lever in one plane selects the speed of movement of the movable element without completing the actual driving connections therefor and subsequent movement of the lever in another plane selects the direction of movement and completes the driving connections.

7. A machine tool having, in combination, a movable element, a distributing transmission for delivering power to said element to move it in any one of a plurality of three mutually perpendicular lines of motion, a shaft connected to said distributing transmission to deliver power thereto, and a selective control lever for driving said shaft in either direction at either of two rates of speed.

8. In a milling machine, a work table, means for supporting said work table for movement in any one of three mutually perpendicular lines of movement, and a single control element operable to effect movement of said table along the line selected in either direction at either one of two different speeds.

9. In a machine tool, in combination, a movable element, power transmission for effecting movement of said element, a single control lever capable of two different kinds of movement, and connections between said control lever and said power transmission whereby one movement of the lever selects the speed of movement of the movable element and the other movement of the lever selects the direction of movement of the element, said connections insuring that one movement is absolutely completed before the other can occur.

10. A machine tool having, in combination, a movable element, a distributing transmission for delivering power to said element to move it in any one of a plurality of three mutually perpendicular lines of motion, a shaft connected to said distributing transmission to deliver power thereto, and means for driving said shaft in either direction at either of two rates of speed, said means comprising a selective control lever and connections whereby movement of said lever in a horizontal plane operates to select the speed of the shaft and subsequent movement in a vertical plane operates to select the direction of rotation of the shaft.

11. A milling machine having, in combination, a column, a work table positioned in front of said column, power transmission for moving said table, a control lever near the top of the column projecting forwardly to a position over the work table, said power transmission including a pair of control elements mounted on the column, and connections between said control lever and said elements including a pair of members operatively associated with said lever whereby movement of said lever in one plane operates to select the speed of movement of the table and subsequent movement of the lever in another plane operates to select the direction of movement of the table.

12. A milling machine having, in combination, a column, a work table mounted for movement in front of said column, power transmission for moving said table including a pair of control elements, a control lever near the top of the column projecting forwardly to a position over the table, and connections between said control lever and said elements whereby to effect the movement of the table by said power transmission, said connections including a pair of members connected respectively with said two control elements, and means operable in the movement of said lever in one plane to effect a connection between the lever and one or the other of said members and operable in the movement of the lever in another plane to actuate such selected member and thereby its corresponding control element.

13. A machine tool having, in combination, a movable element, a distributing transmission for delivering power to said element to move it in any one of a plurality of three mutually perpendicular lines of motion, a shaft connected to said distributing transmission to deliver power thereto, and means for driving said shaft in either direction at either of two rates of speed.

14. In a machine tool, the combination of a movable element, power transmission for effecting movement of said element, a single control lever, and connections between said control lever and said power transmission whereby movement of the lever in one plane selects the speed of movement of the movable element and movement in the other plane selects the direction of movement, said connections including a pair of spaced members having oppositely disposed notches therein, and a part operable by said lever into engagement with either of said notches whereby to connect the corresponding member with the control lever.

15. In a machine tool, in combination, a movable element, power transmision for effecting movement of said element, a single control lever capable of movement only in a single plane initially and subsequently in another plane, and connections between said control lever and said power transmission whereby movement of the lever in one plane selects the speed of movement of the movable element and movement in the other plane selects the direction of movement.

16. In a milling machine, the combination of a table, power transmission for moving said table including a pair of control elements, means providing a closed chamber near the top of the column at one side thereof, a control lever mounted in said chamber for pivotal movement in a horizontal plane and in a vertical plane, a casing mounted on the column below said chamber, said power transmission being mounted in said casing, and means connecting said control elements with said lever including a pair of slide bars and a part operable in the movement of said lever to effect a connection between it and either one of said slide bars.

17. A milling machine having, in combination, a column, a work table positioned in front of said column, a power transmission for moving said table, a control lever, and a connection between said control lever and said power transmission whereby an initial movement of said lever operates to select the speed of movement to be imparted to the table without accomplishing the actual driving connection to produce such movement and a subsequent movement of the lever operates to connect the transmission to move the table at the selected speed in either of two opposite directions.

18. A machine tool having, in combination, a column, a movable element carried by said column and mounted for movement along either of two mutually perpendicular lines of movement, a control lever having one end thereof mounted upon said column, power transmission moving said table including two constantly driven shafts and a pair of clutch devices operable by said control lever to connect either of said two shafts with said movable element whereby to effect movement of said table at either of two speeds in either of two directions along the line of movement selected.

19. A milling machine having, in combination, a column, a work table positioned in front of said column, power transmission for moving said table, a control lever, a connection between said control lever and said power transmission whereby an initial movement of said lever operates to select the speed of movement of the table and a subsequent movement of the lever operates to close said transmission to move the table, and means constraining the lever from moving initially from its neutral position and permitting said subsequent movement after said initial movement.

20. In a machine of the character described, the combination of a column, a work support movably mounted thereon, a feed drive shaft and a traverse drive shaft rotatably mounted upon the column, and transmission means adapted to connect either of said shafts to actuate said work support including a single shaft mounted on the column and means adapted to connect said shaft to either of said drive shafts to derive motion therefrom in either of two directions.

21. In a machine of the character described, the combination of a column, a work support movably mounted thereon, feed and traverse drive shafts mounted on said column, transmission means between said drive shafts and said work support including a single shaft, and a pair of reversing clutch devices adapted to connect said single shaft to either of said drive shafts, and means to operate said clutch devices adapted first to select one of said clutches and then to operate the clutch selected.

22. In a machine of the character described, the combination of a column, a work support movably mounted thereon, parallel feed and traverse drive shafts rotatably mounted on said column, a power transmission adapted to operate said work support including a shaft perpendicular to said drive shafts and adapted to be connected alternately thereto, and means adapted to connect either of said drive shafts to said transmission.

23. In a machine of the character described, the combination of a column, a work support movably mounted thereon, feed and traverse drive shafts rotatably mounted on said column, a single power transmission connected to said work support, means adapted to connect said drive shafts alternately to said transmission including a reversing clutch device between each drive shaft and said transmission, and a control element adapted to select and actuate said clutch devices.

24. A machine tool comprising, in combination, a support, an element movable transversely on said support, power transmission to move said element in opposite directions at feed and traverse speeds, and a lever adapted to control said transmission, said lever having a portion confined in an H slot and being movable in the cross portion of the slot without effecting a connection in said transmission and being movable in the parallel slots to effect connections in said transmission.

25. A machine tool comprising, in combination, a support, an element mounted for movement transversely in front of said support, power transmission to move said element in forward and reverse directions and at feed and traverse speeds, and a lever to control said transmission, said lever having a portion intermediate its ends movable in an H slot.

26. A machine tool comprising, in combination, a support, an element mounted for movement transversely in front of said support, power transmission to move said element at feed and traverse speeds, and a lever to control said transmission, said lever having a portion intermediate its ends movable in an H slot.

In testimony whereof, I have hereunto affixed my signature.

GUSTAF DAVID SUNDSTRAND.